United States Patent [19]

Cox

[11] 3,959,154

[45] May 25, 1976

[54] METHOD AND COMPOSITION FOR RETARDING THE EVAPORATION OF AMMONIA AND AMINES

[76] Inventor: Robert Powers Cox, 5428 Lake Mendota Drive, Madison, Wis. 53705

[22] Filed: Apr. 30, 1975

[21] Appl. No.: 573,270

[52] U.S. Cl................................. 252/1; 21/60.5 A; 252/541; 252/542; 252/548; 423/407; 423/406; 260/247; 260/251 R; 260/290 R; 260/319.1; 260/563 R; 260/578; 260/583 R; 260/583 J

[51] Int. Cl.² .......................................... G09K 3/00

[58] Field of Search ................. 21/60.5; 252/1, 541, 252/542, 548; 423/407, 406; 260/247, 251 R, 290 R, 319.1, 563 R, 578, 583 R, 583 J

[56] References Cited
UNITED STATES PATENTS 3,557,007  1/1971  Cox................................. 423/407 X 3,879,318  4/1975  Forsyth................................. 252/1

*Primary Examiner*—Leland A. Sebastian
*Attorney, Agent, or Firm*—Andrus, Sceales, Starke & Sawall

[57] ABSTRACT

This invention relates to the retardation of evaporation of ammonia and amines from essentially aqueous solutions by admixture thereto of an alkyl ether having the formula:

$$R-(O[CH_2]_y)_n-R'$$

, wherein R is an alkyl group containing from 8 to 30 carbon atoms, and R' is an —OH or —NH₂ group, $y$ is an integer of 2 to 4, and $n$ is an integer of 1 to 10.

8 Claims, No Drawings

METHOD AND COMPOSITION FOR RETARDING THE EVAPORATION OF AMMONIA AND AMINES

BACKGROUND OF THE INVENTION

Ammonia is frequently an active component in products such as polishes; cleaning solutions; grease-cutters and dissolvers; etchants; rubber and plastic latices; pulping processes for paper manufacture; leaching solutions for metal ores such as copper, molybdenum, and nickel; fertilizers and the like. Because of its volatility, the ammonia tends to evaporate into the atmosphere, thereby losing effectiveness and causing objectionable odors and atmospheric pollution. Likewise, hydrazine has applications as a fuel, propellant and soldering flux wherein control of evaporation is beneficial to its use.

Amines are used as solvents, surfactants, rust inhibitors, caustic cleaning agents and chemical reactants in the preparation of many products. Likewise, they have been used in extraction of metals from ores. Unwanted evaporation causes poluting, caustic and noxious vapors, loss of effectiveness, and decreased control of process concentration.

Evaporation of volatile liquids and vapors can be retarded by use of physical means such as tanks, floating spheres of inert material, or thick layers of foam or light and inert barrier materials such as wax, oil, and the like. However, such approaches are expensive and can be used only for static storage of bulk ammonia or hydrazine.

Cetyl and stearyl alcohol have been found to be effective in retarding the evaporation rate of water, and long chain alkyl amides and hydroxyethylated amides have been claimed to be effective in reducing the evaporation of such materials as methanol and acetone from their aqueous solutions. However, these materials are without effect on the evaporation of ammonia or amines from water solution.

Long chain aliphatic amines have been used to retard the evaporation of ammonia and hydrazine from aqueous solutions as disclosed in U.S. Pat. No. 3,557,007. However these materials are very insoluble in water and are therefore difficult to apply. Also, when used alone, they migrate very slowly through aqueous solutions and therefore are relatively slow to reform an impermeable surface monolayer after agitation of the surface.

SUMMARY OF THE INVENTION

The present invention relates to a method of retarding the evaporation of ammonia and amines by the addition of minute quantities of long chain hydroxy alkyl ethers or amino alkyl ethers having the formula:

where R is an alkyl group containing from 8 to 30 carbon atoms, R' is an —OH or —NH$_2$ group, $y$ is an integer of 2 to 4, and $n$ is an integer of 1 to 10. The resulting products are stable to evaporation during storage, transit, or use under conditions of physical agitation in the presence of impurities. Concomitant with the suppression of evaporative loss, the polluting, disagreeable and potentially toxic odors of ammonia and amines are eliminated and the economic efficiency of the amines or amminia-containing products is enhanced.

In many natural processes and conditions, ammonia and amines are deposited or liberated. It is a further object of this invention to minimize the deleterious odors of such amine or ammonia-producing natural sources as pet relief boxes, cattle feed pens, sewage treatment and disposal units, and the like.

Likewise, an essential step in various commercial processes involves the removal of ammonia and amines from exit gases by means of scrubbing towers and the like. An additional object of the present invention is to increase the efficiency of scrubbing by modifying the evaporation rates of previously absorbed ammonia or amines from the relatively thin layer of absorbing liquid in the scrubbing tower, or the like.

A still further object is to provide a method for concentration of ammonia and amines in their essentially aqueous solutions by preferential inhibition of evaporation of the active components.

The present invention is stated as pertaining to essentially aqueous solutions of ammonia and amines but, in practice, may be applied to originally non-aqueous ammonia and amine liquids in contact with the atmosphere, since the onset of evaporation condenses water from the atmosphere to convert the surface layer to an essentially aqueous system. Likewise, any molecular absorption of water vapor will do the same.

The capture of by product ammonia and amines by scrubbing towers and the like is important for the preservation of a clean and innocuous environment. Also, the economic development of new energy sources depends to some extent on reclamation of byproducts such as ammonia and amines. Thus, for example, typical Colorado "Mahogany Ledge" oil shale yields 12 tons of NH$_3$ per 10,000 tons of feed. Besides the direct economic value of the reclaimed ammonia, there is a secondary benefit in that catalytic cracking methods can be used only in the absence of nitrogenous impurities.

The present invention, by increasing the efficiency of reclamation of ammonia and amines, will be of considerable benefit in the utilization of oil shale as an energy source.

In the reclamation of junked automobiles, scrapped metal cans and appliances and metal fractions from municipal refuse, the major problem resides in the complete removal of non-ferrous metals since even traces of copper, nickel and molybdenum carry through to yield an inferior iron product. To date, very sophisticated processes such as electroslag remelting, vacuum-melting, electron-beam melting and the like have proven expensive but still incapable of removal of nickel from the crude melted metal. By using a preliminary leaching step with modified ammonia and/or amines, practically all of the above non-ferrous metals are removed into solution, and the residual junk metal is far more attractive for reprocessing into iron and steel. Without the evaporation-retardant, however, the process would not be economical or safe for the environment.

When high sulfur coal and other fuels are burned in power generation and heating plants, chemical manufacturing plants, and iron and other metallurgical manufacturing plants, the contamination of the atmosphere by oxides of sulfur must be controlled completely and economically. Heretofore, lime solutions have been used to clean the exhaust gases by reaction and conversion of sulfur oxides to sodium and calcium sulfates. However, the latter byproducts form sludges which lose their effectiveness rapidly, and are difficult to manage in operation and disposal. Also, these byproducts have little economic utility. Far more promising results have recently been obtained by use of ammonia in lieu of the caustic soda. Sludge formation is minimal and the byproduct ammonia sulfate is saleable. The primary drawback to date has been the uncontrolled evaporation of ammonia, which leads to decreased efficiency and also formation of a "plume" in the exhaust caused by vapor phase reaction of evaporated ammonia with gaseous oxides of sulfur. The present invention is directly applicable to the above problems since it allows the retardation of evaporation of ammonia.

Likewise, the economics of production of aluminum from lateritic ores is enhanced if valuable but troublesome trace metals, such as nickel, are leached out with ammonia or amine solutions instead of being carried over with the aluminum. The present invention, by improving the efficiency and economics of the process, thus contributes to the better utilization of such ores for aluminum production.

DESCRIPTION OF THE PREFERRED EMBODIMENT

In accordance with the invention, a small amount of the following alkyl ether is added to ammonia, or to the amine or to their aqueous solutions:

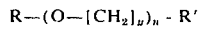

wherein R is an alkyl radical ($C_xH_{2x+1}$, where $x$ is 8 to 30), $y$ is an integer of 2 to 4, $n$ is an integer of 1 to 10, and R' is —$NH_2$ or —OH. Specific examples of ethers which can be employed include lauryl, myristyl, palmityl, stearyl, arachidyl, behenyl, lignoceryl, cerotyl, and n-triacontanoic ethers of ethylene, propylene and butylene glycols and amino alcohols.

The ethers can be prepared by conventional processes such as the Williamson ether synthesis:

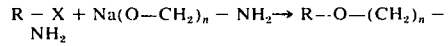

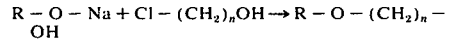

or the ethers may be prepared by hydroxy alkylation of alcohols

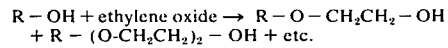

where $n$ is 2 to 8.

The hydroxy ethers can also be prepared from alkyl glyceryl ethers by glycol cleavage and reduction of the resulting alkoxy acetaldehydes.

The ethers can be used either as the pure compounds or as a mixture of ethers, with the mixture containing various proportion of individual ethers each having a different number of carbon atoms in the alkyl group.

The amine to be stabilized against evaporation can be any water soluble, highly volatile amine such as hydrazine, mono and dimethyl amine, mono and diethyl amine, n-propyl amine, n-butyl amine, n-hexyl amine, morpholine, pyridine, aniline, pyrimidene, indole, cyclohexyl amine, and the like.

The concentration of the ether additive with respect to the material to be stabilized will depend on the chemical structure, solubility properties, and initial concentration of the particular material to be stabilized. Also, it is dependent on impurities and other ingredients of formulation, on the stucture of the particular ether additive and on ambient conditions of humidity, temperature, and surface agitation. In general, the ether is employed in an amount of 0.00001 to 1.0% by weight of ammonia or the amine.

It has been found that when the modified ammonia or amine is agitated, the evaporation rate reverts momentarily to that of unmodified material. Thus, the ammonia or amine will evaporate at almost the normal rate during agitation and the evaporation will decrease essentially upon cessation of agitation. By proper control of the additive or additive blend, the rate and degree of resumption of evaporation-retardancy on cessation of agitation can be optimized for the particular application.

The mechanism by which the additive operates to inhibit evaporation of amines and ammonia is not understood completely. However, it is believed that the hydrophile-lipophile balance of the additive is such that it migrates to the solution interface and through the formation of a sterically oriented and reversibly bonded mono or polymolecular sheath, it prevents the passage of the amine or ammonia molecules to the atmosphere. It is believed that thermally excited ammonia or amine molecules impinge on the oriented surface layer, excess kinetic energy needed for evaporation is transferred to the oriented film. Because of the specific orientation of the polar portions of the film, physical diffusion of the ammonia or amine is kept at a minimum.

It is possible that the rate of replenishment of the evaporation-retarding layer on agitation is a function of the concentration, proximity and mobility of dissolved agents and of suspended micelles of the additive.

Although the present additives do decrease the evaporation rate of water to some extent, their utility is predicated on the fact that they effect the evaporation of dissolved ammonia or amines to a far larger extent, even yielding an increase in concentration of the ammonia or amine on exposure to the atmosphere. Thus, the relative evaporation rate of the water is higher than that of the ammonia or amine.

It has been noted that the additives of the present invention are compatible with and enhance the efficacy of the long chain alkyl amines of U.S. Pat. No. 3,557,007. Sensitivity to agitation, impurities and temperature fluctuation are noticeably decreased with concomitant increase in commercial utility. Also solubility characteristics of the long chain alkyl amines are enhanced. As described in U.S. Pat. No. 3,557,007, the alkyl amines have the formula; R-$NH_2$, where R is an alkyl group containing from 12 to 26 carbon atoms. From 0.00005 to 1.0% by weight of the alkyl amine, with respect to the evaporable compound, can be used.

The stabilized ammonia or amine can be used in a wide variety of industrial and consumer products, such as household cleaners, fertilizers, ammonia-modified polishes, waxes, latices, rocket propellants and the like. Various other materials such as solvents, preservatives, emulsifiers, surfactants, abrasives, ignition deterrants, fillers, and the like, can be incorporated in the product, depending on its particular use and application, and the addition of materials of this type will not effect the stabilization of evaporation of the ammonia or amine.

The following examples illustrate the method of the invention.

EXAMPLE I 100 ml portions of 26% aqueous ammonia were modified by the addition of the following compounds and 10 cc aliquots of each were tested for rate of loss of ammonia as a function of time, at a constant ambient temperature of 21°C. In each case, the additive was contained as a 2½% solution in normal butanol to facilitate the process. After exposure to the atmosphere, the modified ammonia samples were tested for $NH_4OH$ content by titration to pH 7 with 0.5N HCl. The results were as follows:

| Additive | % By Wt. | 6 Hours % $NH_4OH$ Remaining (Titration) | 24 Hours % $NH_4OH$ Remaining (Titration) |
|---|---|---|---|
| None (control) | 0 | 0.25 | 0 |
| n-butanol (control) | 0 | 0.25 | 0 |
| $C_{18}H_{37}$—O—$CH_2CH_2$—OH | .005 | 94 | 90 |
| $C_{18}H_{37}$—(O—$CH_2CH_2$)$_2$—OH | .005 | 56 | 32 |
| $C_{18}H_{37}$—(O—$CH_2CH_2$)$_3$—OH | .005 | 21 | 0–5 |
| $C_{18}H_{37}$—(O—$CH_2CH_2$)$_4$—OH | .005 | 18 | 0–5 |
| $C_{18}H_{37}$—(O—$CH_2CH_2$)$_{10}$H | .005 | 19 | 0–5 |
| $C_{18}H_{37}$—O—$CH_2CH_2CH_2$—OH | .005 | 80 | 71 |
| $C_{18}H_{37}$—(O—$CH_2CH_2CH_2$)$_2$—OH | .005 | 61 | 40 |
| $C_{18}H_{37}$—(O—$CH_2CH_2CH_2$)$_3$—OH | .005 | 20 | 0–5 |
| $C_{18}H_{37}$—(O—$CH_2CH_2CH_2$)$_4$—OH | .005 | 18 | 0–5 |
| $C_{18}H_{37}$—(O—$CH_2CH_2CH_2$)$_{10}$—OH | .005 | 15 | 0–5 |
| $C_{18}H_{37}$—O—$(CH_2)_4$—OH | .005 | 71 | 42 |
| $C_{18}H_{37}$—O—$(CH_2)_6$—OH | .005 | 67 | 40 |
| $C_{16}H_{33}$—O—$CH_2CH_2OH$ | .005 | 59 | 30 |
| $C_{14}H_{29}$—O—$CH_2C_2$—OH | .005 | 40 | 22 |
| $C_{12}H_{25}$—O—$CH_2CH_2OH$ | .005 | 30 | 18 |
| $C_{10}H_{21}$—O—$CH_2CH_2$—OH | .005 | 31 | 0–5 |
| $C_8H_{17}$—O—$CH_2CH_2$—OH | .005 | 20 | 0–5 |
| $C_{20}H_{41}$—O—$CH_2CH_2$—OH | .005 | 94 | 90 |
| $C_{22}H_{45}$—O—$CH_2CH_2$—OH | .005 | 95 | 88 |
| $C_{24}H_{49}$—O—$CH_2CH_2$—OH | .005 | 93 | 90 |
| $C_{22}H_{45}$—(O$CH_2CH_2$)$_2$—OH | .005 | 97 | 92 |
| $C_8H_{17}$—O—$CH_2CH_2CH_2$—$NH_4$ | .005 | 20 | 0–5 |
| $C_{10}H_{21}$—O—$CH_2CH_2CH_2$—$NH_2$ | .005 | 24 | 10 |
| $C_{12}H_{25}$—O—$CH_2CH_2CH_2$—$NH_2$ | .005 | 29 | 20 |
| $C_{14}H_{29}$—O—$CH_2CH_2CH_2$—$NH_2$ | .005 | 48 | 31 |
| $C_{16}H_{33}$—O—$CH_2CH_2CH_2$—$NH_2$ | .005 | 20 | 46 |
| $C_{18}H_{37}$—O—$CH_2CH_2CH_2$—$NH_2$ | .005 | 80 | 69 |
| $C_{20}H_{41}$—O—$CH_2CH_2CH_2$—$NH_2$ | .005 | 83 | 72 |
| $C_{22}H_{45}$—O—$CH_2CH_2CH_2$—$NH_2$ | .005 | 85 | 70 |
| $C_8H_{17}$—O—$CH_2CH_2$—$NH_2$ | .005 | 32 | 20 |
| $C_{18}H_{37}$—O—$CH_2CH_2$—$NH_2$ | .005 | 81 | 55 |
| R*—O$CH_2CH_2CH_2$—$NH_2$ | .005 | 38 | 29 |
| R**—O$CH_2CH_2CH_2$—$NH_2$ | .005 | 84 | 76 |
| R***—O$CH_2CH_2CH_2$—$NH_2$ | .005 | 21 | 10 |

| | Percent Carbon Distribution | | | | | |
|---|---|---|---|---|---|---|
| | C6 | C8 | C10 | C12 | C14 | C16 | C18 |
| R* | — | 8 | 7 | 48 | 18 | 9 | 10 |
| R** | — | — | — | — | 5 | 30 | 65 |
| R*** | 5 | 60 | 33 | 2 | — | — | — |

The results of the above tests indicate that the compounds of the invention were highly effective in retarding the evaporation of ammonia as compared to the control samples.

EXAMPLE II

50% by weight aqueous solutions of various amines were modified by addition of 0.05% of evaporation-retarding ethers and titrated with hydrochloric acid after 6 hours' exposure to the atmosphere. The results were as follows:

| | Ratio of Evaporative Loss of Amine From Modified Material to That of Unmodified Control | | | | | | |
|---|---|---|---|---|---|---|---|
| Additive | Hydrazine | mono ethyl amine | t-butyl amine | di-ethyl amine | n-propyl amine | di-methyl amine | pyridine |
| $C_{22}H_{45}$—O—$CH_2CH_2$—OH | .10 | .15 | .01 | .01 | .02 | .02 | .02 |
| $C_{18}H_{37}$O—$CH_2CH_2$—OH | .10 | .10 | .02 | .06 | .03 | .02 | .01 |
| $C_{18}H_{37}$—O—$CH_2CH_2CH_2$—$NH_2$ | .15 | .20 | .02 | .07 | .04 | .03 | .04 |

In all of the above illustrations, it was noted that properties and effects depending on ammonia or amine content were enhanced by the addition of evaporation-controlling ethers. Polluting and irritating odors were noticeably decreased.

The additives of the invention were generally effective for evaporation inhibition of aqueous amines from solution, and it was noted that the particular effects depended to some extent on the original concentration and structure of the amine. In general, as the hydrocarbon portion of the amine increases, better results were obtained by use of longer chain lengths in the additive and/or higher percent. An increased percent amine in solution dictated the use of longer chain additives. Thus, for example, when the amine solution is changed from 10% ethyl amine to 50% butyl amine, the alkyl group of the ether is preferably changed from 0.005% $C_{16}H_{33}$ to 0.025% $C_{22}H_{45}$. Also, in the practical application of the present invention, the proper choice and concentration of the evaporation-retarding ether is governed by presence of other additives such as organic and inorganic salts; soaps and detergents; colors and perfumes; and the like. These might combine to alter the solubility and the diffusion coefficient of the ether or modify its mode of formation of micelles and surface layers. In general, it is found that for a particular application, one or more of the ethers is effective and that best results might be obtained by empirically "tailoring" blends of the ether to meet the requirements of a specific composition or product.

EXAMPLE III

Liquid ammonia samples were modified by the addition of 0.05% by weight of the following materials and the relative evaporation losses recorded:

2-hexadecyloxy ethanol
2-octadecyloxy ethanol
2-eicosyloxy ethanol
3-octadecyloxy propanol
4-octadecyloxy butanol
3-hexadecyloxy propylamine In each case, the evaporation rate of the ammonia was noticeably reduced by the additive.

EXAMPLE IV

The following examples are illustrative of the use of minor amounts of the products of the present invention in conjunction with the teachings of U.S. Pat. No. 3,557,007 to increase the evaporation-retardancy of the long chain alkyl amines under conditions of agitation.

A variable speed physical agitator having a frequency of 0–400 cycles/minute and amplitude of ½ cm. was equipped to contain 0.5 cm. dishes having a depth of ½ cm. 26% aqueous ammonia was modified by addition of 0.01% n-behenyl amine and allowed to equilibrate.

To other identical samples were added various amounts of 2-stearyloxy ethanol with the following results:
- A. Control: No additive
- B. 0.0001% behenyl amine
- C. 0.0001% behenyl amine plus 0.0001% 2-stearyloxy ethanol
- D. 0.0001% behenyl amine plus 0.0005% 2-stearyloxy ethanol
- E. 0.0001% behenyl amine plus 0.0010% 2-stearyloxy ethanol
- F. 0.0001% 2-stearyloxy ethanol
- G. 0.0002% 2-stearyloxy ethanol
- H. 0.0005% 2-stearyloxy ethanol
- I. 0.0010% 2-stearyloxy ethanol
- J. 0.0020% 2-stearyloxy ethanol The pH of all solutions was >14 originally.

| Composition | pH OF SOLUTIONS AFTER 2 HOUR AGITATION Cycles per Minute | | | | | | |
|---|---|---|---|---|---|---|---|
| | 0 (Static) | 25 | 50 | 75 | 100 | 200 | 400 |
| A. | 8 | 7–8 | 7 | 7 | 7 | 7 | 7 |
| B. | >14 | >14 | 8–9 | 7 | 7 | 7 | 7 |
| C. | >14 | >14 | >14 | >14 | >14 | 10–12 | 10–12 |
| D. | >14 | >14 | >14 | >14 | >14 | >14 | >14 |
| E. | >14 | >14 | >14 | >14 | >14 | >14 | >14 |
| F. | 12–14 | >14 | 8–9 | 7 | 7 | 7 | 7 |
| G. | >14 | >14 | >14 | 8–9 | 7 | 7 | 7 |
| H. | >14 | >14 | >14 | >14 | >14 | 12–14 | 12–14 |
| I. | >14 | >14 | >14 | >14 | >14 | >14 | >14 |
| J. | >14 | >14 | >14 | >14 | >14 | >14 | >14 |

From the above results it is seen that although as little as 0.001% of stearyloxy ethanol was effective in a static test, a higher percent was required to protect against ammonia evaporation if the sample was agitated. However, as little as 0.001% stearyloxy ethanol greatly enhanced the effectiveness of the alkyl amine additive described in U.S. Pat. No. 3,557,007.

Various modes of carrying out the invention are contemplated as being within the scope of the following claims particularly pointing out and distinctly claiming the subject matter which is regarded as the invention.

I claim:

1. A method of decreasing the rate of evaporation of ammonia or amines comprising the step of contacting an evaporable material selected from the group consisting of ammonia and amines with a compound having the formula:

$$R - (O - [CH_2]_y)_n - R'$$

where R is an alkyl group having from 8 to 30 carbon atoms, R' is —OH or —NH$_2$, y is an integer of 2 to 4 and n is an integer of 1 to 10.

2. The method of claim 1, wherein the evaporable material is in aqueous solution.

3. The method of claim 1, wherein the amine is water soluble and is selected from the group consisting of hydrazine, mono and dimethyl amine, mono and diethyl amine, n-propyl amine, n-butyl amine, n-hexyl amine, morpholine, pyridine, aniline, pyrimidene, pyrrole, indole, cyclohexyl amine.

4. The method of claim 1, and including the step of adding to said evaporable material an alkyl amine having the formula:

$$R'' - NH_2$$

wherein R'' is an alkyl group containing from 12 to 26 carbon atoms.

5. A composition of matter, comprising an aqueous carrier having dissolved therein an evaporable material selected from the group consisting of ammonia and a water soluble amine, said carrier having admixed therewith a compound capable of retarding the evaporation of said material from said carrier, said compound having the formula:

$$R - (O - [CH_2]_y)_n - R'$$

where R is an alkyl group having from 8 to 30 carbon atoms, R' is —OH or —NH$_2$, y is an integer of 2 to 4 and n is an integer of 1 to 10.

6. The composition of claim 5, wherein said compound is present in an amount of 0.00001 to 1.0% by weight of said evaporable material.

7. The composition of claim 5, wherein said carrier has dissolved therein an alkyl amine having the formula:

$$R'' - NH_2$$

where R'' is an alkyl group containing from 12 to 26 carbon atoms.

8. The composition of claim 7, wherein the alkyl amine is present in an amount of 0.00005 to 1.0% by weight of said material.

* * * * *

UNITED STATES PATENT AND TRADEMARK OFFICE
CERTIFICATE OF CORRECTION

PATENT NO. : 3,959,154
DATED : May 25, 1976
INVENTOR(S) : ROBERT P. COX.

It is certified that error appears in the above-identified patent and that said Letters Patent are hereby corrected as shown below:

Column 5, line 39, Cancel "$C_{14}H_{29}$-O-$CH_2C_2$-OH" and substitute therefor ---$C_{14}H_{29}$-O-$CH_2CH_2$-OH---, Column 5, line 45, Cancel "$C_8H_{17}$-O-$CH_2CH_2CH_2$-$NH_4$" and substitute therefor ---$C_8H_{17}$-O-$CH_2CH_2CH_2$-$NH_2$---

Signed and Sealed this

Fifth Day of October 1976

[SEAL]

*Attest:*

RUTH C. MASON
*Attesting Officer*

C. MARSHALL DANN
*Commissioner of Patents and Trademarks*